US006879350B2

United States Patent
Kwon et al.

(10) Patent No.: US 6,879,350 B2
(45) Date of Patent: Apr. 12, 2005

(54) METHOD OF DISPLAYING HELP-WORDS CONTENTS OF ON-SCREEN DISPLAY MENU ITEMS IN DIGITAL TV RECEIVER

(75) Inventors: Il Gun Kwon, Seoul (KR); Ji Yeon Hwang, Seoul (KR); Eui Seung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 480 days.

(21) Appl. No.: 09/984,222

(22) Filed: Oct. 29, 2001

(65) Prior Publication Data

US 2002/0075409 A1 Jun. 20, 2002

(30) Foreign Application Priority Data

Dec. 20, 2000 (KR) .................................. 10-2000-79079

(51) Int. Cl.[7] ................................................ H04N 5/50
(52) U.S. Cl. ........................................ 348/569; 725/40
(58) Field of Search ................................ 348/569, 564, 348/553; 725/40, 43; 345/705, 707–709

(56) References Cited

U.S. PATENT DOCUMENTS

| 6,151,059 A | * | 11/2000 | Schein et al. .................. 725/37 |
| 6,505,348 B1 | * | 1/2003 | Knowles et al. ............... 725/49 |
| 2001/0003846 A1 | * | 6/2001 | Rowe et al. .................... 725/47 |

2002/0109732 A1 * 8/2002 Ward et al. .................. 345/810

FOREIGN PATENT DOCUMENTS

JP          09-130695       5/1997

OTHER PUBLICATIONS

NTL Digitalplus User Guide, pp. 98–99 (Sep. 2000).
www.ddelec.com/digital/remote.htm (DDElectronics) See "arrow buttons" and "help" button (Apr. 30, 2000).
http://625.uk.com/digital/index.htm (Wiseman) see pp. 5–7 (Aug. 6, 1999).
"Using your Sky digibox", DRX 100 (Amstrad), see p. (ii), (Nov. 1998).

* cited by examiner

Primary Examiner—Victor R. Kostak
(74) Attorney, Agent, or Firm—Birch, Stewart, Kolasch & Birch, LLP

(57) ABSTRACT

A method of displaying help-words content of on-screen display menu items in a digital TV receiver having a plurality of buttons including OSD function, help function, and marker movement buttons. The method includes the steps of displaying an OSD menu area on at least a first portion of a previously-displayed program image when a user presses the OSD function button, indicating one of items of the OSD menu area using the marker when the user presses the marker movement buttons, and displaying a help-words contents area of the item indicated by the marker on at least a second portion of the previously-displayed program image when the user presses the help button.

9 Claims, 7 Drawing Sheets

METHOD OF DISPLAYING HELP-WORDS CONTENTS OF ON-SCREEN DISPLAY MENU ITEMS IN DIGITAL TV RECEIVER

BACKGROUND OF THE INVENTION

1. Field of the Invention

The present invention relates to a method of displaying help-words contents of on-screen display menu items in a digital TV receiver.

2. Background of the Related Art

Generally, a process of setting and adjusting functions of a digital TV receiver is carried out through a function of an OSD(on-screen display) menu. This is because the construction and functions of the digital TV receiver get complicated lately, thereby requiring explanation of the construction and functions consequently. The explanation of the functions is provided with a manual form. If the explanation is provided with the OSD menu function, a user enables to execute a user demanding function. Thus, using the OSD menu function is the trend of the times. In other words, the user enables to watch help-words contents as well as the OSD menu on the screen without looking up the manual tediously.

From now on, techniques of displaying help-words contents of the user-demanding menu items on a screen of a display device according to a related art will be explained in brief.

In the most general display method, whenever the OSD menu items are displayed and one of the items is directed by a cursor, a corresponding help-words content always shows up on a portion of a screen. In accordance with this display method, the help-words content is displayed all the time on the screen when unnecessary, thereby complicating the screen on which the OSD menu is displayed and even interrupting the OSD menu function occasionally. Moreover, the help-words content as well as the OSD menu items is always displayed on the screen so as to reduce the area occupied by the help-words content. Eventually, the quantity of the help-words content is limited.

In another display method according to a related art, carried out are on/off functions of displaying/erasing the help-words contents on/from the screen through the OSD menu area. In this case, if the on-function of the help-words content is executed on the OSD menu item, the help-words content is always displayed on an at least portion of the screen so as to conceal an at least a portion of the screen. Therefore, a user is unable to watch the concealed screen. Moreover, as mentioned in the above explanation, when the on-function of the help-words is executed, the corresponding help-words content is always displayed on the screen when unnecessary so as to disturb the use of the OSD menu function.

In a further display method according to a related art, the help-words contents are constructed as separated completely from the OSD menu area. In such a case, when the user executes the on-function of the help-words, the entire screen, i.e. the previously-displayed program image and the OSD menu area, is totally blocked by the help-words content. Thus, it is unable to watch immediately or simultaneously the user-demanding help-words content on executing the OSD menu function.

Unfortunately, in the methods of the related art, the help-words content co-exists on the screen with the OSD menu area all the time. Therefore, the user is unable to watch the help-words contents the moment he wants to look up or delete the displayed help-words content immediately whenever he wants.

SUMMARY OF THE INVENTION

Accordingly, the present invention is directed to a method of displaying help-words contents of on-screen display menu items in a digital TV receiver that substantially obviates one or more problems due to limitations and disadvantages of the related art.

An object of the present invention is to provide a method of displaying help-words contents of on-screen display menu items in a digital TV receiver enabling to display a user-demanding help-words content without covering, i.e. interrupting, the displayed program image.

Another object of the present invention is to provide a method of displaying help-words contents of on-screen display menu items in a digital TV receiver enabling to display a help-words content on a screen in an OSD menu item conveniently in response to a user's demand instantly as well as make the displayed help-words content disappear on the screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a digital TV receiver having a plurality of buttons including OSD function, help function, and mark means movement buttons, a method of displaying help-words contents of on-screen display menu items in a digital TV receiver includes the steps of displaying an OSD menu area on at least a first portion of a previously-displayed program image when a user presses the OSD function button, indicating one of items of the OSD menu area using the mark means when the user presses the mark means movement buttons, and displaying a help-words contents area of the item indicated by the mark means on at least a second portion of the previously-displayed program image when the user presses the help button.

Preferably, the method further includes the step of making the help-words contents disappear on the previously-displayed program image as well as leaving only the OSD menu area on the image when the user releases the help button.

Preferably, the method further includes the step of making the help-words contents disappear on the previously-displayed program image as well as leaving only the OSD menu area on the image when the user presses the buttons except the pressed help button.

Preferably, the method further includes the step of making the help-words contents disappear on the previously-displayed program image as well as leaving only the OSD menu area on the image when the user releases the pressed help button and then presses the released help button again.

Preferably, the OSD function, help function, and mark means movement buttons are formed on a front panel of a body of the digital TV receiver.

Preferably, the OSD function, help function, and mark means movement buttons are formed on a front panel of a remote controller of the digital TV receiver.

Preferably, at least a portion of the contents area of the item indicated by the mark means is overlapped with the OSD menu area on the previously-displayed program image.

Preferably, the contents area of the item indicated by the mark means is displayed on an additional area separated from the OSD menu area on the previously-displayed program image.

Preferably, the mark means includes one of a cursor and an icon using a graphic.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
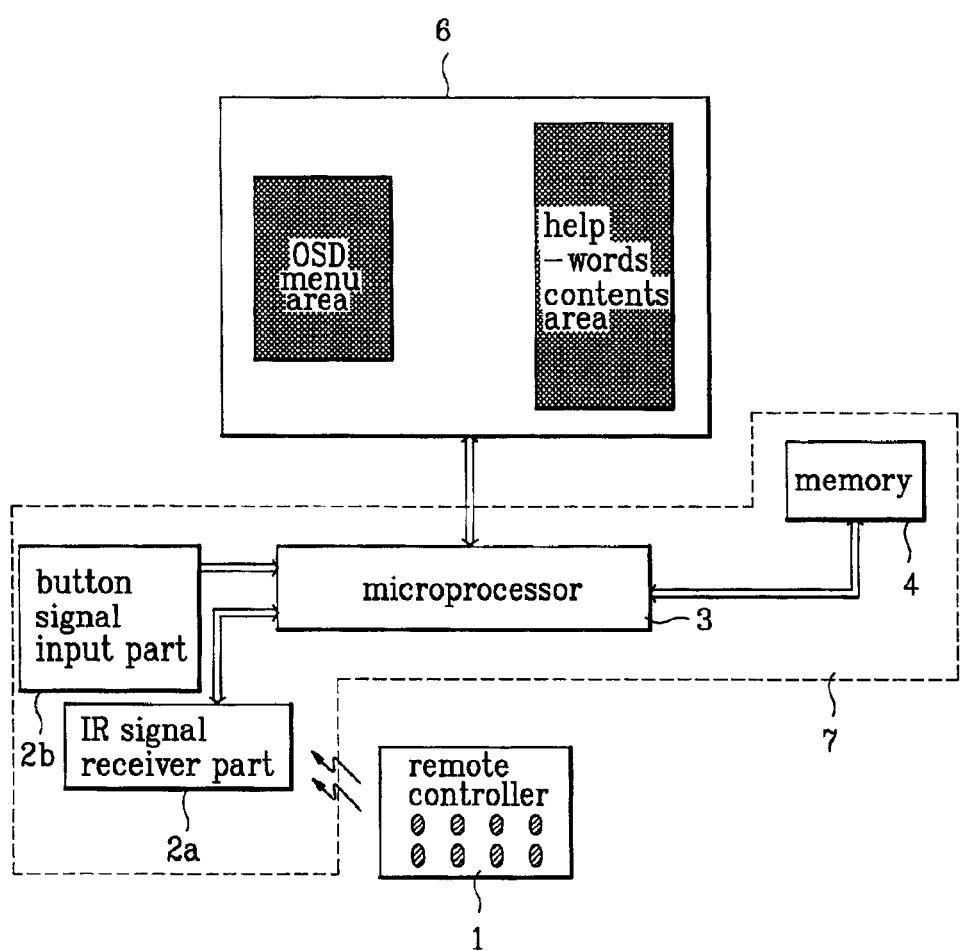
FIG. 1 illustrates a block diagram of a digital TV receiver construction for explaining a method according to the present invention.

FIG. 1 illustrates a block diagram of a digital TV receiver construction for explaining a method according to the present invention.

Referring to FIG. 1, a digital TV receiver includes a remote controller 1, an IR(infrared) signal receiver part 2a, a button signal input part 2b, a microprocessor 3, a memory 4, and a display device 6. Unexplained reference numerals 5 and 7 are an image(or screen) of the display device 6 and a body of the digital TV receiver, respectively.

The remote controller 1 constructed with a plurality of buttons including a help-words button transmits an IR signal(or a remote control signal) corresponding to the button pressed by a user toward the body of the digital TV receiver.

The IR signal receiver part 2a converts the IR signal received from the remote controller 1 into a recognizable voltage signal and then outputs the converted voltage signal. And, the microprocessor 3 interprets the voltage signal so as to carry out a control corresponding to the interpretation.

Meanwhile, the button signal input part 2b converts a key signal from the buttons formed on a front panel of the body 7 into a recognizable voltage signal and then outputs the converted signal to the microprocessor 3. Namely, the IR signal receiver part 2a processes a wireless signal, while the button signal input part 2b processes a wired signal.

The memory 4 stores plenty of data including information of an OSD menu and provides the monitor 6 with necessary display information in accordance with a control of the microprocessor 3.

The display device 6 then displays the information provided by the memory 4 on the screen 5.

Figure 2:
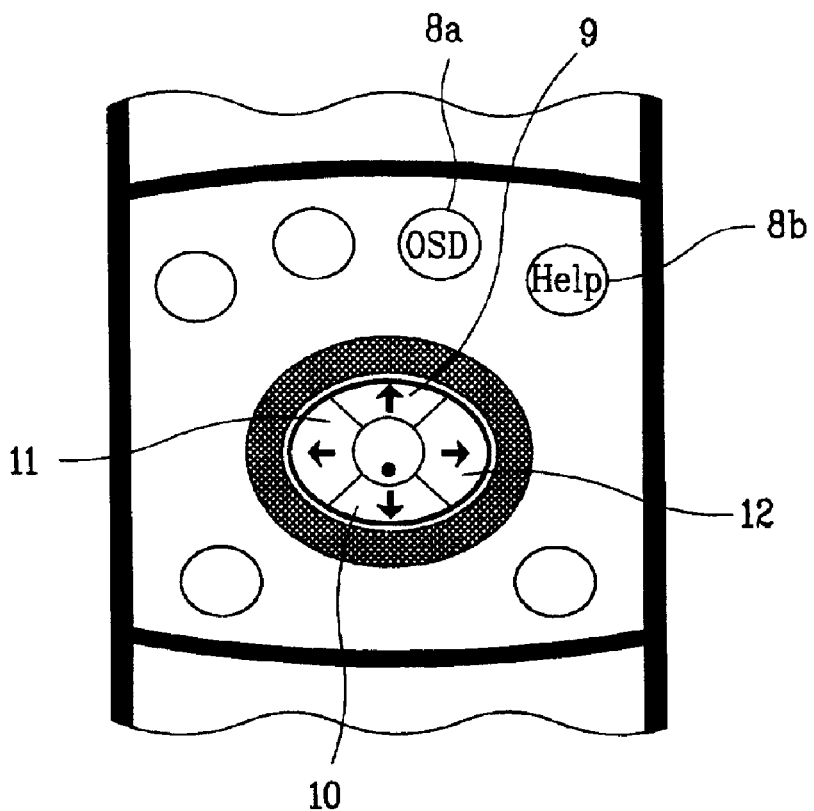
FIG. 2 illustrates a panel of a remote controller of a digital TV receiver construction for explaining a method according to the present invention.

FIG. 2 illustrates a panel of a remote controller of a digital TV receiver construction for explaining a method according to the present invention.

Referring to FIG. 2, a button 8a is an OSD function button directing an execution of an OSD function. Another button 8b is a help button directing a display of help-words contents of the item required for carrying out the OSD menu. Such an direction is carried on as long as the button is pressed by a user but is discontinued once the user releases the help button. Other buttons 9, 10, 11, and 12 carries out functions of moving a cursor upward, downward, left, and right on the screen 5 by a user's manipulation, respectively.

Figure 3:
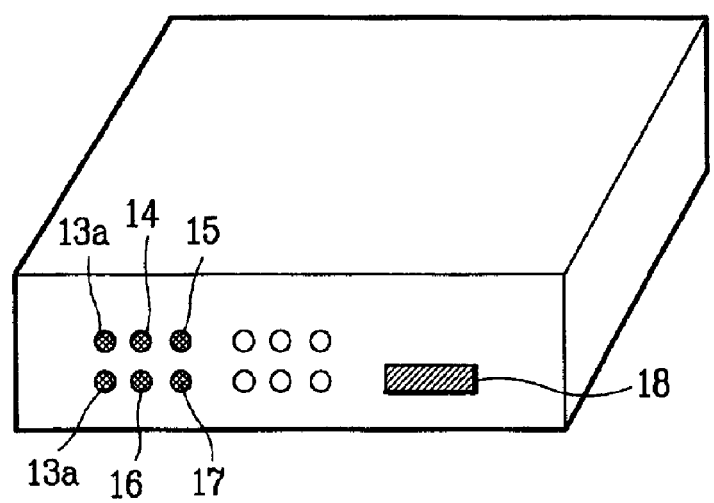
FIG. 3 illustrates buttons installed at a front panel of a digital TV receiver for explaining a method according to the present invention.

FIG. 3 illustrates buttons installed at a front panel of a digital TV receiver for explaining a method according to the present invention.

Referring to FIG. 3, the OSD function button is designated by a numeral '13a'. The help button is designated by a numeral '13b. Reference numbers 14, 15, 16, and 17 designate buttons carrying out functions of moving a cursor upward, downward, left, and right, respectively on the screen 5,. As shown in FIG. 2 and FIG. 3, the body and remote controller of the TV receiver may have a plurality of other functional buttons failing to be designated by the specific numerals.

A first embodiment of the present invention will be explained as follows. As mentioned in the above description, the OSD, help, and cursor-movement function buttons are installed at the body and remote controller respectively. For the convenience of explanation, the buttons at the remote controller will be described in the following.

First, when a user presses an arbitrary button of the remote controller, a corresponding key code value is transmitted as an IR signal form toward the body 7. The IR signal receiver part 2a of the body 7 then processes the key code value having the IR signal form and then transfers the processed signal to the microprocessor 3. And, the microprocessor 3 carries out the necessary function on a previously-displayed program image on the display device 6 in response to the transferred key code value. Namely, when the user presses the OSD function button in FIG. 2, the microprocessor 3 reads the OSD menu data from the memory 4 and then executes a graphic processing required for the read data. The processed data are then displayed on at least a portion of the previously-displayed program image as the OSD menu area by the microprocessor 3.

Subsequently, the user may press the cursor movement buttons 9 to 12 in FIG. 2 so as to designate one of the items in the OSD menu area using a cursor or an icon(or mark means). When the cursor is directing one item in the OSD menu area, the user presses the help button 8b so that help contents of the item directed by the cursor are read from the memory 4 by a control of the microprocessor 3. The read help contents are displayed on at least a portion of the previously-displayed program image as the help contents area.

Figure 4A:
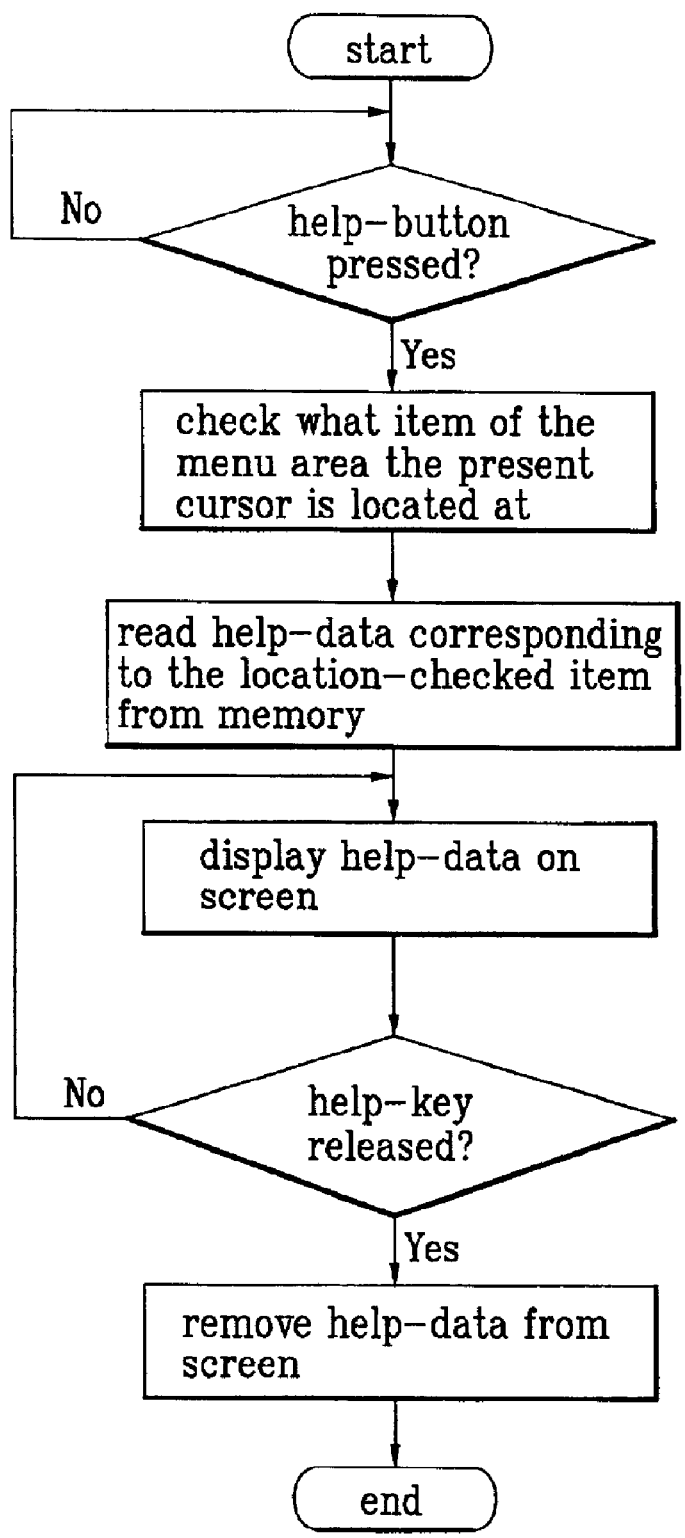
FIG. 4A illustrates a flowchart of a system program for displaying help-words contents according to a first embodiment of the present invention.

FIG. 4A illustrates a flowchart of a system program for displaying help-words contents according to a first embodiment of the present invention.

Referring to FIG. 4A, the microprocessor 3 checks whether the user presses the help button 8b of the remote controller 1. If the help button 8b is pressed, the microprocessor 3 ascertains that the cursor is located at which item in the OSD menu area, reads the contents data of the item corresponding to the ascertained location from the memory 4, and then carries out the required processing such as the graphic processing on the data. The processed data are displayed on at least a portion of the previously-displayed program image, which still remains without being blocked or removed therefrom, as a help-words contents area. The microprocessor 3 then checks whether the pressed help button 8b is released. If the help button 8b is still pressed, the microprocessor 3 keeps on displaying the help-words contents area. Otherwise, the microprocessor 3 makes the help-words contents area disappear on the screen. As mentioned in the above explanation, the key code value from the exclusive help button 8b is transmitted to the microprocessor 3 only while the OSD area is displayed on the screen 5 by the program in FIG. 4A. Hence, in the present invention, the help-words contents area fails to be displayed when the corresponding item is indicated by the cursor on the OSD menu area but is displayed only while the user presses the help button 8b.

The first embodiment of the present invention is characterized in that, while the OSD menu area is displayed on the screen 5 of the display device 6 and one of the items in the OSD menu is indicated by the cursor in accordance with the user's selection, if one of the help buttons shown in FIG. 2 and FIG. 3 is pressed by the user, the help-words contents area for the selected item is displayed on at least a portion of the image 5 like a pop-up window. And, if the user releases the pressed help button 8 or 13, the pop-up contents disappear on the screen 5.

Figure 4B:
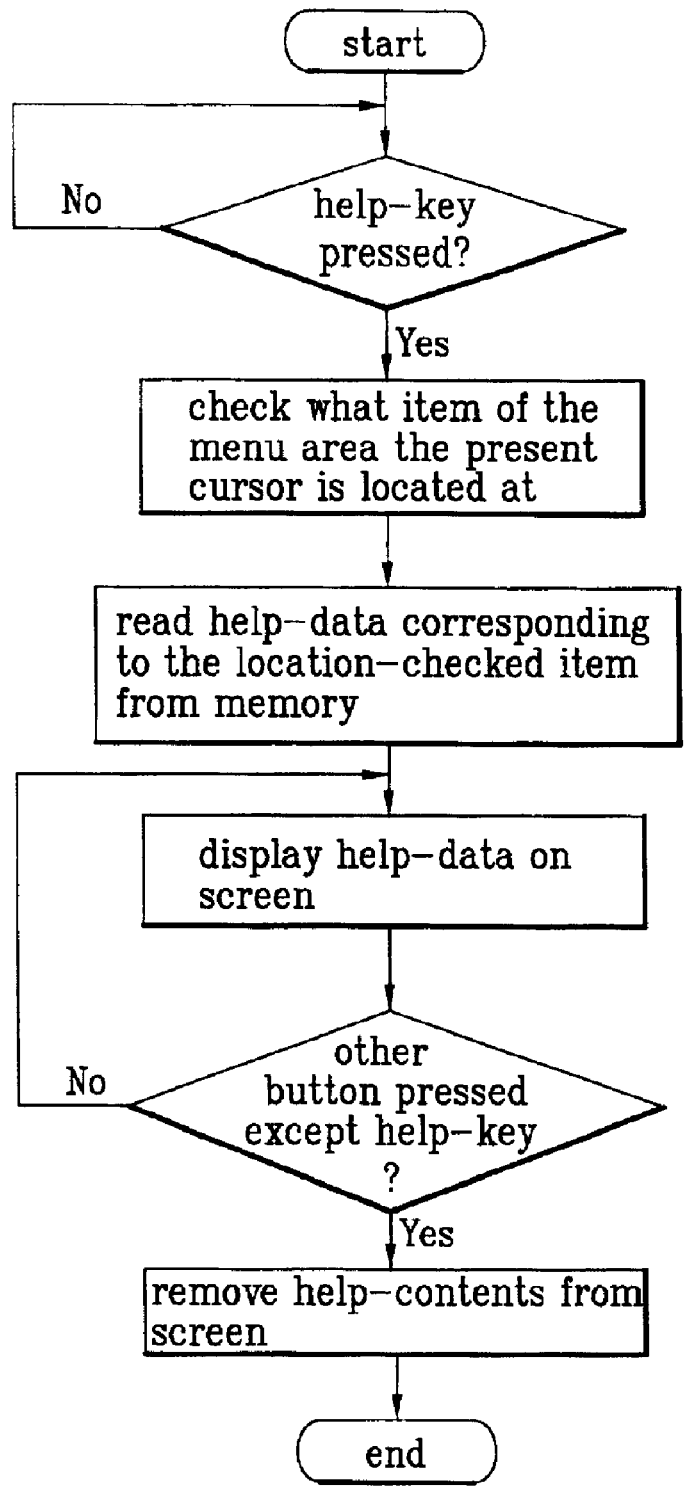
FIG. 4B illustrates a flowchart of a system program for displaying help-words contents according to a second embodiment of the present invention.

FIG. 4B illustrates a flowchart of a system program for displaying help-words contents according to a second embodiment of the present invention.

The second embodiment of the present invention is similar to the first embodiment of the present invention but differs from the first embodiment in making the help-words contents area disappear on the screen 5 using not the help button 8b but other buttons. Namely, if the user presses one arbitrary button except the help button 8b of the remote controller 1, the help-words contents area disappears from the screen and the system program returns to the OSD menu process.

Referring to FIG. 4B, the microprocessor 3 checks whether the user presses the help button 8b of the remote controller 1. If the help button 8b is pressed, the microprocessor 3 ascertains that the cursor is located at which item in the OSD menu area, reads the contents data of the item corresponding to the ascertained location from the memory 4, and then carries out the required processing such as the graphic processing on the data. The processed data are displayed on at least a portion of the previously-displayed program image, which still remains without being blocked or removed therefrom, as a help-words contents area. The microprocessor 3 then checks whether an arbitrary one of the buttons of the remote controller 1 or body 7 except the pressed help button 8b is pressed. If the arbitrary button is pressed, the microprocessor 3 makes the help-words contents area disappear on the screen. Otherwise, the microprocessor 3 keeps the help-words contents area displayed on the screen.

Figure 4C:
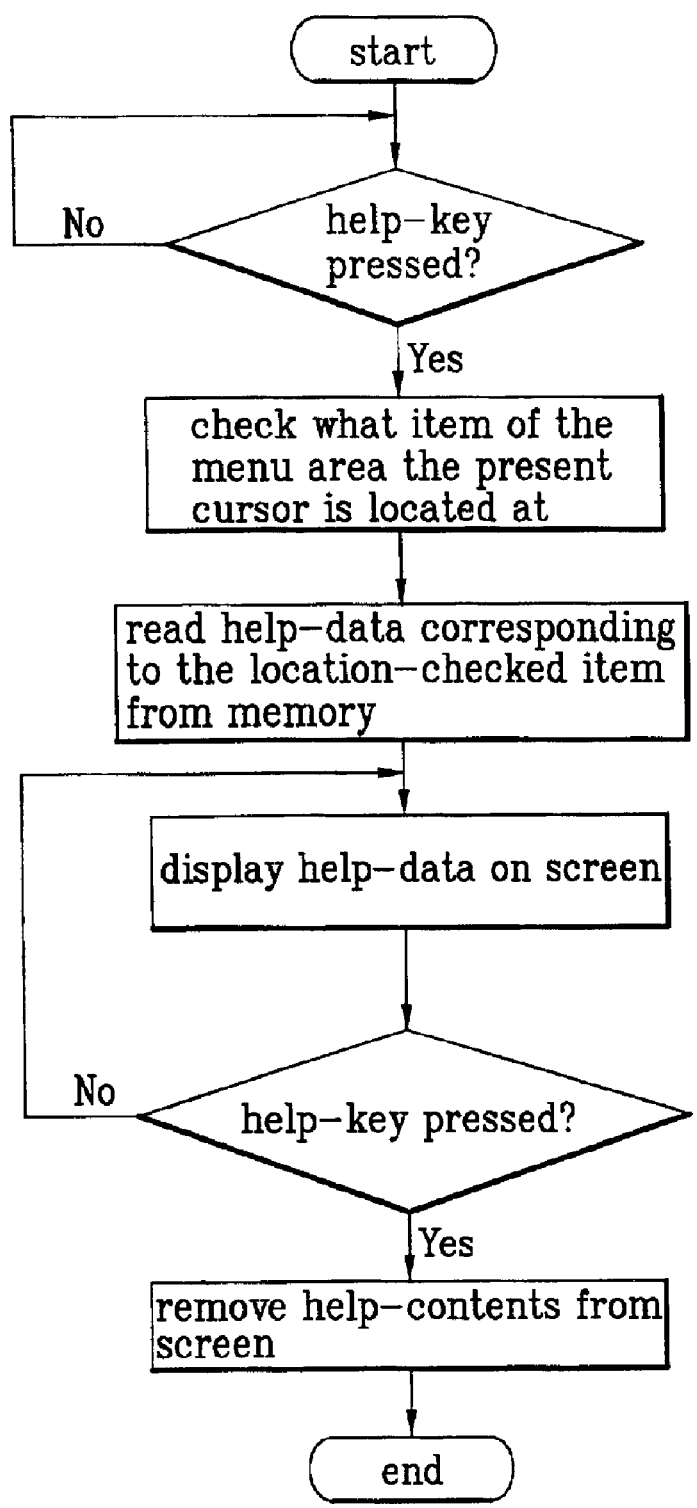
FIG. 4C illustrates a flowchart of a system program for displaying help-words contents according to a third embodiment of the present invention.

FIG. 4C illustrates a flowchart of a system program for displaying help-words contents according to a third embodiment of the present invention.

The third embodiment of the present invention is similar to the first or second embodiment of the present invention but differs from them in making the help-words contents disappear on the screen 5 by pressing the pressed help button 8b again. Namely, if the help button 8b having been pressed to display the help-words contents area is pressed again by the user, the help-words contents area disappears from the screen and the system program returns to the OSD menu process.

Referring to FIG. 4C, the microprocessor 3 checks whether the user presses the help button 8b of the remote controller 1. If the help button 8b is pressed, the microprocessor 3 ascertains that the cursor is located at which item in the OSD menu area, reads the contents data of the item corresponding to the ascertained location from the memory 4, and then carries out the required processing such as the graphic processing on the data. The processed data are displayed on at least a portion of the previously-displayed program image, which still remains without being blocked or removed therefrom, as a help-words contents area. The microprocessor 3 then checks whether the pressed help button 8b of the remote controller 1 or the body 7 is pressed again. If the help button 8b is pressed again, the microprocessor 3 makes the help-words contents area disappear on the screen. Otherwise, the microprocessor 3 keeps the help-words contents area on appearing on the screen.

Figure 5:
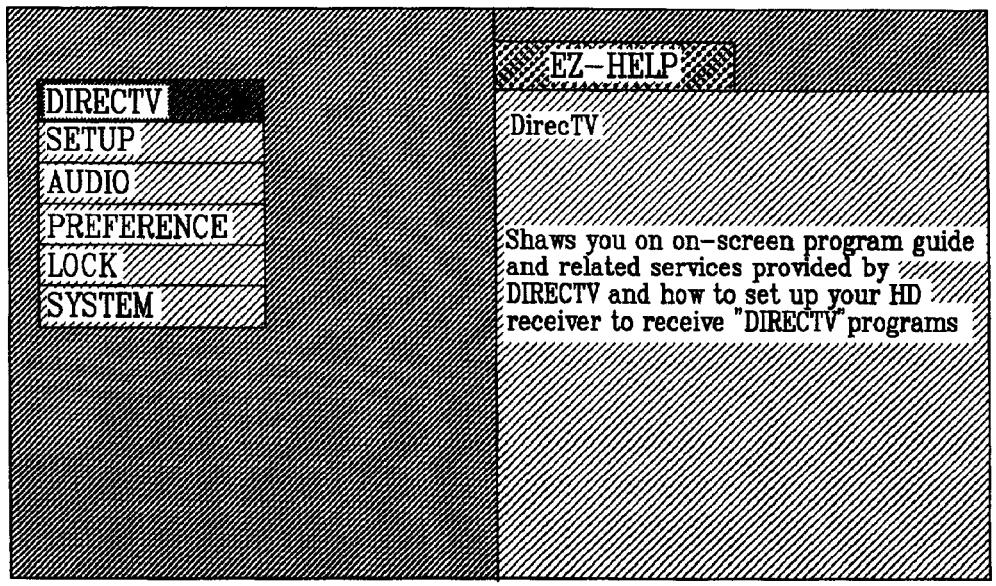
FIG. 5 illustrates a diagram that a help-words contents area of a "DIRECTV" item in items of a displayed OSD menu area is displayed on a screen.

FIG. 5 illustrates a diagram that a help-words contents area of a "DIRECTV" item in items of a displayed OSD menu area is displayed on a screen.

Figure 6:
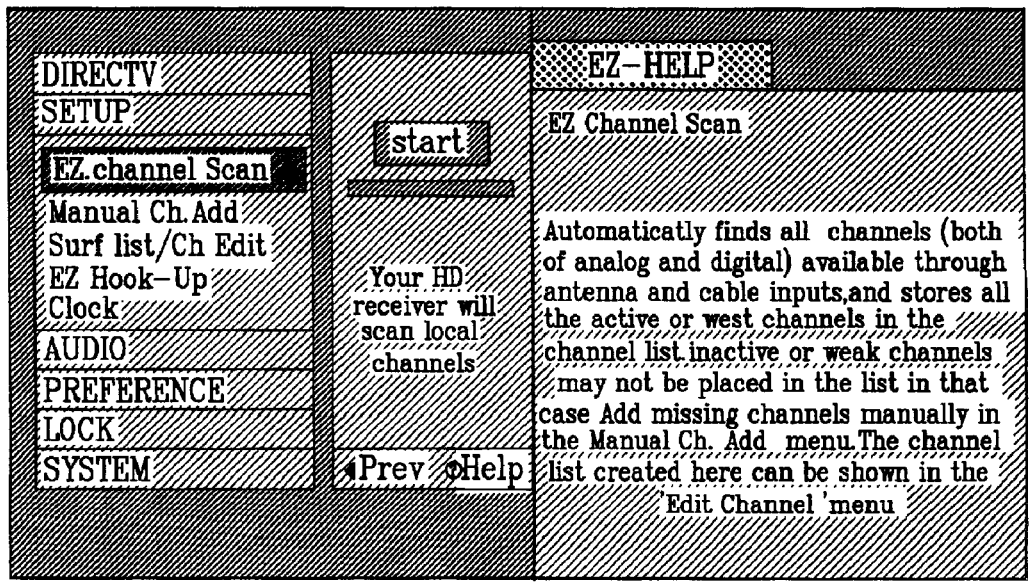
FIG. 6 illustrates a diagram that a help-words contents area of an "EZ Channel Scan" as a sub-item of a "SETUP" item in items of a displayed OSD menu area is displayed on a screen.

FIG. 6 illustrates a diagram that a help-words contents area of an "EZ Channel Scan" as a sub-item of a "SETUP" item in items of a displayed OSD menu area is displayed on a screen.

Referring to FIG. 5, items of the OSD menu include "DIRECTV", "SETUP", "AUDIO", "PREFERENCE", "LOCK", and "SYSTEM", and the cursor(or mark means) indicates the "DIRECTV" by a user's selection.

Referring to FIG. 6, sub-items of the item "SETUP" includes "EZ Channel Scan", "Manual Ch. Add", "Surf List/Ch. Edit", "EZ Hook-Up", and "Clock". And, the cursor indicates the "EZ Channel Scan" by a user's selection. In the first embodiment, when the user releases the pressed help button 8b, the help-words contents disappear on the previously-displayed program image but the OSD menu area remains on the screen only.

Figure 7:
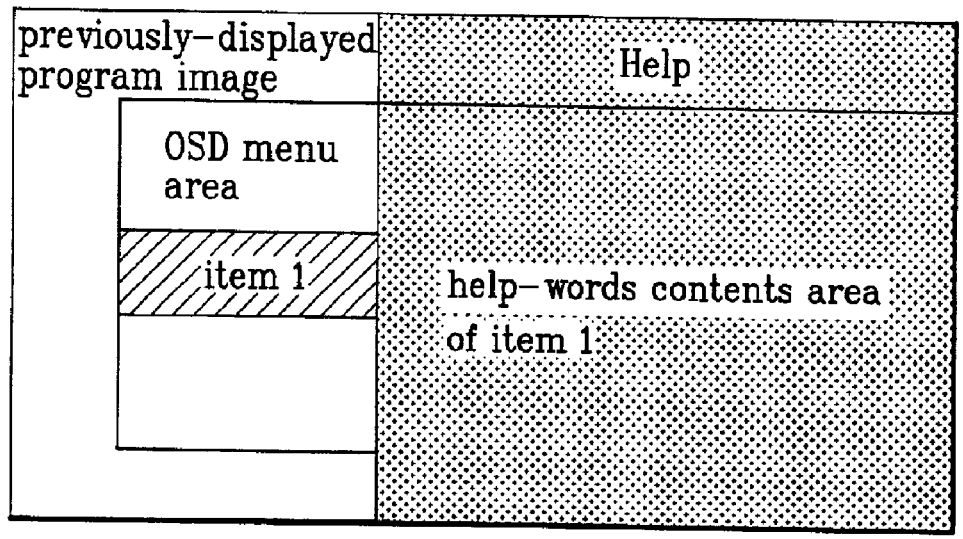
FIG. 7 illustrates a diagram that at least a portion of contents area of an item directed by a cursor is overlapped with an OSD menu area so as to be displayed on a screen.

FIG. 7 illustrates a diagram that at least a portion of contents area of an item directed by a cursor is overlapped with an OSD menu area so as to be displayed on a screen.

Referring to FIG. 7, it is able to display at least a portion of the contents area of the item indicated by the cursor to be overlapped with the OSD menu area on the previously-displayed program image.

Figure 8:
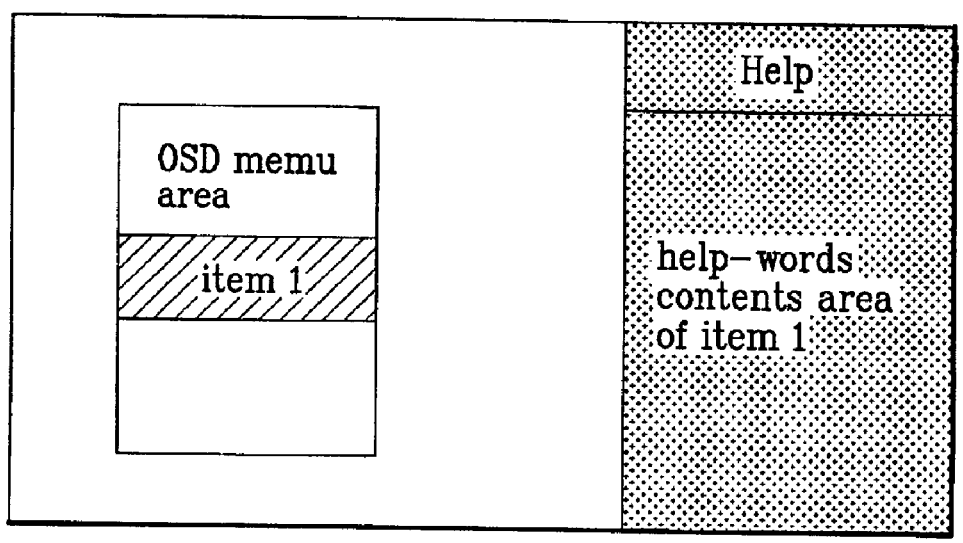
FIG. 8 illustrates a diagram that a contents area of an item directed by a cursor is displayed on a screen separated from an OSD menu area.

FIG. 8 illustrates a diagram that a contents area of an item directed by a cursor is displayed on a screen separated from an OSD menu area.

Referring to FIG. 8, it is able to display the contents area of the item indicated by the cursor to be displayed on an additional area separated from the OSD menu area on the previously-displayed program image.

The description for FIG. 5 to FIG. 8 is commonly applied to the first to third embodiments of the present invention.

Accordingly, the present invention provides the following advantages or benefits.

First, a user displays the item requiring the help-words on a screen as a pop-up box form as well as removes the displayed item immediately and conveniently, thereby enabling to watch the help-words contents without losing the previously-displayed program image entirely or in part.

Second, the help-words contents appears or disappears in accordance with a user's demand, whereby the help-words contents area is not restricted in accordance with the size of the previously-displayed OSD menu area.

Third, the help-words contents appear on a screen as a pop-up form by pressing the help button and disappear instantly on the screen by releasing the help button, thereby requiring no additional button manipulation.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. In a digital TV receiver having a plurality of buttons including OSD function, help function, and mark means movement buttons, a method of displaying help-words contents of on-screen display menu items in a digital TV receiver, comprising the steps of:

displaying an OSD menu area on at least a first portion of a previously-displayed program image when a user presses the OSD function button;

indicating one of items of the OSD menu area using the mark means when the user presses the mark means movement buttons;

displaying a help-words contents area of the item indicated by the mark means on at least a second portion of the previously-displayed program image when the user presses the help button; and making the help-words contents disappear on the previously-displayed program image while leaving only the OSD menu area on the image when the user operates at least one of said plurality of buttons.

2. The method of claim 1, further comprising the step of making the help-words contents disappear on the previously-displayed program image as well as leaving only the OSD menu area on the image when the user releases the help button.

3. The method of claim 1, further comprising the step of making the help-words contents disappear on the previously-displayed program image as well as leaving only the OSD menu area on the image when the user presses the buttons except the pressed help button.

4. The method of claim 1, further comprising the step of making the help-words contents disappear on the previously-displayed program image as well as leaving only the OSD menu area on the image when the user releases the pressed help button and then presses the released help button again.

5. The method of claim 1, wherein the OSD function, help function, and mark means movement buttons are formed on a front panel of a body of the digital TV receiver.

6. The method of claim 1, wherein the OSD function, help function, and mark means movement buttons are formed on a front panel of a remote controller of the digital TV receiver.

7. The method of claim 1, wherein at least a portion of the contents area of the item indicated by the mark means is overlapped with the OSD menu area on the previously-displayed program image.

8. The method of claim 1, wherein the contents area of the item indicated by the mark means is displayed on an additional area separated from the OSD menu area on the previously-displayed program image.

9. The method of claim 1, wherein the mark means includes one of a cursor and an icon using a graphic.

* * * * *